Dec. 26, 1933.  E. H. WALDROP ET AL  1,941,286
COMBINATION WATER CIRCULATOR AND FEED WATER HEATING UNIT FOR BOILERS
Filed Nov. 23, 1932   2 Sheets-Sheet 1

EARL H. WALDROP   INVENTORS.
& GEO. M. PETTY

EARL H. WALDROP
& GEO. M. PETTY
INVENTORS

Patented Dec. 26, 1933

1,941,286

UNITED STATES PATENT OFFICE 1,941,286

COMBINATION WATER CIRCULATOR AND FEED WATER HEATING UNIT FOR BOILERS

Earl H. Waldrop and George M. Petty, Shawnee, Okla.

Application November 23, 1932
Serial No. 644,060

11 Claims. (Cl. 122—428)

Our invention relates to water circulating apparatus for boilers, and more particularly to circulators which function through the action of heat in the fire-box upon water conveying elements exposed therein. The invention also relates to apparatus embodied in the circulator elements for heating feed water as it is injected into the boiler.

The objects of our invention are to provide a device of this class which is new, novel, practical and of utility; the circulator unit of which may be properly stayed, thus insuring safety in operation; which will distribute the circulating water over a large area of the crown-sheet, thus positively protecting it against its ever becoming dry even though the water in the boiler becomes lower than the crown-sheet; which is so constructed that the circulation of the water is positively obtained and at a comparatively high velocity; the circulator unit of which houses the heating unit for the incoming feed water; the feed water heating unit of which is easily removable for replacement or repairs, and is easily accessible for periodic inspection or cleaning; which will utilize the force of the circulating water to expedite or accelerate movement of the incoming feed water; the entire installation of which may be accomplished without impairing the requisite flexibility to accommodate expansion and contraction, and without impairing the boiler's working capacity or structural strength; which will strengthen rather than weaken the usual boiler structure; the heater element of which may be installed and removed without removing any of the usual appurtenances of the fire-box or boiler; and, which will be efficient in accomplishing all of the purposes for which it is intended.

With these and other objects in view as will more fully appear, our invention consists in the construction, novel features, and combination of parts hereinafter more fully described, pointed out in the claims hereto appended, and illustrated in the accompanying two-sheet drawing of which, Figure 1 is a vertical sectional view of the fire-box end of a typical boiler, showing in side elevation one embodiment of the device installed for use;

Like characters of reference designate like parts in all of the figures.

Figure 1:
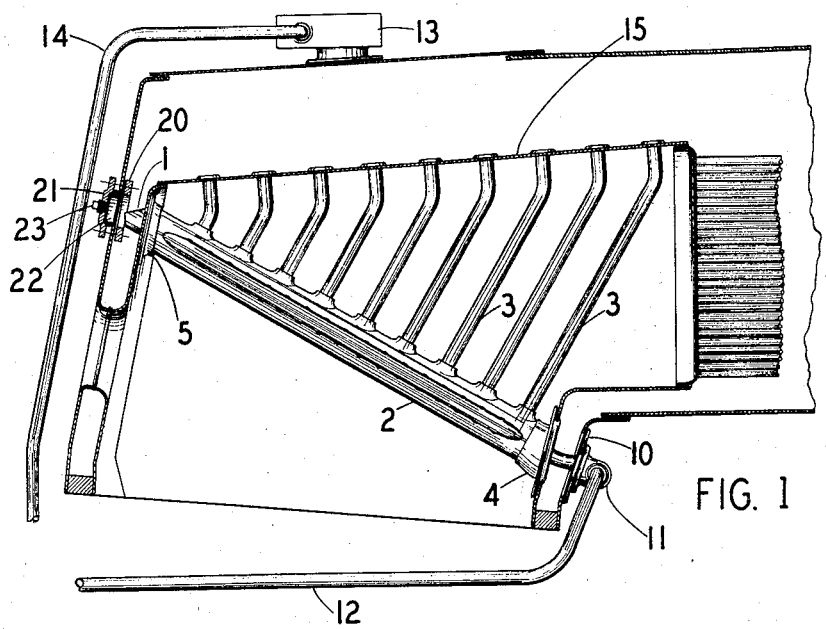
Figure 2:
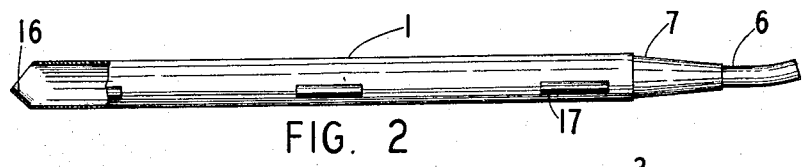
Fig. 2 is a side elevational view of the feed water heater element.

It is understood that various changes in the form, proportion, size, shape, weight, and other details of construction within the scope of our invention, may be resorted to without departing from the spirit or broad principles of our invention, and without sacrificing any of the advantages thereof; and it is also understood that the drawings are to be interpreted as being illustrative and not restrictive.

Practical embodiments of the invention as illustrated in the drawings comprise the following described structures.

Referring now more particularly to the embodiment of the invention illustrated in Figs. 1 to 4 inclusive, in which the reference numeral 1 indicates as a whole a substantially tubular heater element, and 2 indicates as a whole a combined heater casing and boiler water circulator tube having a desired plurality of auxiliary circulator pipes 3 leading therefrom upwardly through the usual boiler crown-sheet 15. Said casing 2 is rigidly connected at one end to the lower portion of the throat-sheet of the boiler by any desired means such as a flanged coupling 4, and extends upwardly at an angle through the fire-box where its upper end portion is connected by a flanged coupling 5 to the fire-box back-sheet at a point slightly below said crown-sheet. It will be understood of course that said casing 2 communicates through said throat-sheet and the fire-box back-sheet with the interior of the boiler.

The heater element 1 consists substantially of a hollow tube adapted to be inserted downwardly through said casing 2 and to be held in spaced relation thereto by a plurality of spacers 17 which are welded or otherwise attached to the exterior thereof. The upper end of said element 1 is cut diagonally and its edge 16 is turned upwardly to act as a means for deflecting the feed water from the inner face of the rear outer shell or back-wall of the boiler. The lower end of said element 1 is provided with a Venturi tube 7 and a tubular spout or extension 6 which extends through the throat-sheet and through the outer shell adjacent thereto where a removable tie plate or flange 10 seals between the boiler shell and the protruding end portion of the spout 6. A check valve 11 connects the lower end of the spout 6 to a feed water line 12 leading from an injector, boiler feed pump, or any desired seat of water supply, not shown. A usual steam turret or fountain 13 and steam pipe 14 may be used for operating such injector or pump.

At a point substantially in alinement with said element 1, the back-wall of the boiler is provided with an opening through which the element 1 may be installed, removed, inspected and cleaned. Said opening is closed by an inner flanged plate 20 having a tubular protrusion 22 extending through the opening and connected exteriorly of the boiler to a removable plate 21. The plate 21 is preferably provided with a central plug 23 through which a hose, not shown, may be inserted for cleaning out the heating element 1 or the interior of the casing 2.

It may be seen from the foregoing description that since the heater element is considerably larger in diameter than the inlet spout 6, the speed of the flow of the water will be materially decreased when it enters the heater element, and consequently will have more time in its flow through the element to become heated to a high temperature by conduction from the boiler water circulating through the casing 2 therearound. It may also be seen that the boiler water will be forced by thermal induction upwardly within the casing 2 in a comparatively thin substantially annular stream around the heater element 1, and upwardly around the exhaust end of the heater element, and consequently will assist in drawing the feed water from the heater element. The fact that the circulating boiler water is confined to a thin stream or layer around the heater element, renders it possible for the fire within the fire-box to more quickly heat the boiler water in the casing. The circulator tubes or pipes 3 act as an outlet for a portion of the circulating boiler water and this surplus is discharged at spaced points over the crown-sheet 15, thus giving it constant protection from excessive heat from the fire-box thereunder.

Figures 3, 4:
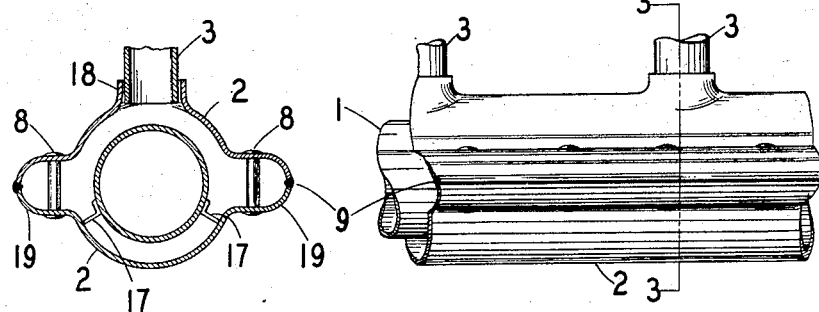
Fig. 3 is a sectional view taken along the line 3—3 of Fig. 4.
Fig. 4 is a fragmentary elevational view showing the heater element within a portion of the circulator element.

As may best be seen in Fig. 3, the casing 2 is made in two complemental sections which are welded together edge to edge as shown at 9. Water channels 19 are provided at each side of the heater element 1, and not only increase the capacity of the casing 2, but also act as a means for receiving stay-bolts 8 for reinforcing the casing 2. Upwardly extending flanges or necks 14 are provided in the upper portion of the casing 2 for receiving the lower ends of the circulator tubes 3. The protrusions shown on each side of the circulator casing form an agency by which a walled seam can be made to hermetically seal the casing by welding or the like thereby making it an integral unit, and the protrusions themselves are capable, because of their structural features together with the shape of the casing, of allowing the insertion of stay-bolts as shown at proper intervals to reinforce the entire structure thus affected.

An additional utility of these protrusions is to assist in the support of the fire brick commonly installed in the fire-box of a coal burning locomotive to properly baffle the fire.

Figure 5:
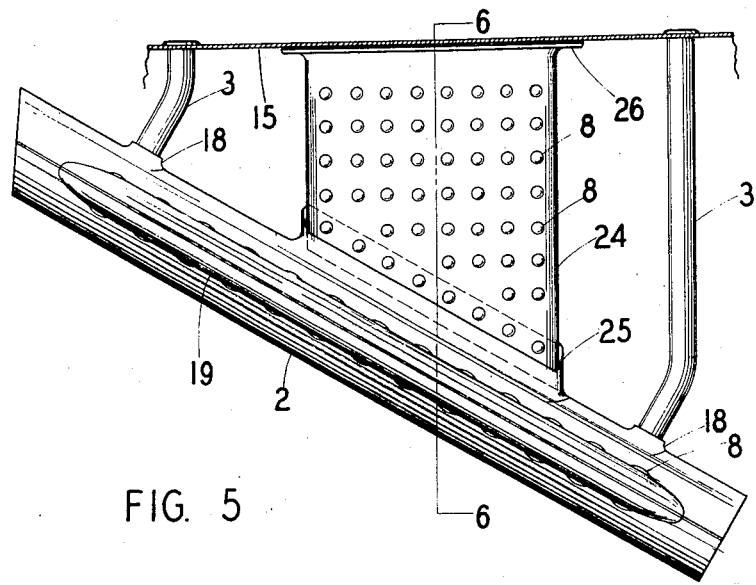
Fig. 5 is a side elevational view of a slightly different embodiment of the invention than that illustrated in Figs. 1 to 4 inclusive; and, Fig. 6 is a sectional view taken along the line 6—6 of Fig. 5.
Figure 6:
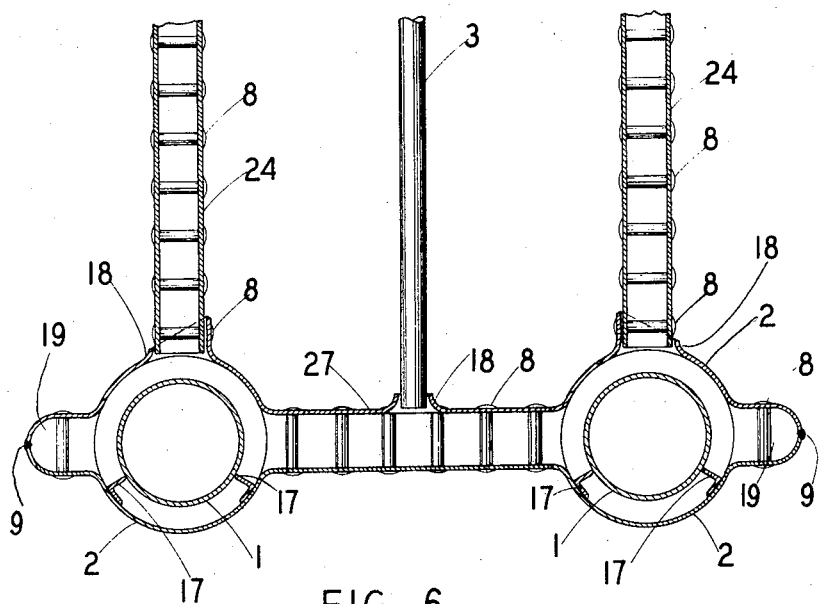

In Figs. 5 and 6 is illustrated a slightly different embodiment of the invention. In this embodiment, two of the casings 2 are joined by a communicating hollow bridge 27 which is braced by a plurality of the stay-bolts 8, and the upper surface of which is provided with a plurality of flanges 18 for receiving the lower ends of the circulator tubes 3, the upper ends thereof being connected through the crown-sheet 15 as has previously been described with reference to Fig. 1. The upper one of the complemental sections forming each of the casings 2 is provided with an upstanding water leg 24 which is stayed as illustrated. The water legs are each connected at their upper ends to the crown-sheet 15, and both communicate with the interior of the boiler thereabove. Flanges 25 and 26 act as a means for connecting the water legs to the casings 2 and the crown-sheet 15.

The last above described embodiment provides greater heating surface, greater capacity of circulation, as well as affording greater strength to the entire mechanism and to the fire-box. The bridge 27 acts as an ordinary baffle for baffling the fire before it enters the boiler tubes. It will be understood of course that organization as previously described hereinabove and as indicated by the reference numerals 20 to 23 inclusive will be provided for each of the casings 2, also that if found desirable such organization could readily be provided in the boiler shell adjacent the lower end of each of the heater elements 1.

It is thought that the operation of the device will be obvious and that a person skilled in the art could readily install and operate the device from the foregoing description.

Obviously the invention is susceptible of embodiment in forms other than that which is illustrated in the accompanying drawings and described herein, and is applicable for uses and purposes other than as detailed, and we therefore consider as our own all such modifications and adaptations and other uses of the forms of the device herein described as fairly fall within the scope of our invention.

Having thus described our invention, what is claimed and desired to be secured by Letters Patent, is:

1. In a combination water circulator and feed water heater for boilers, the combination with a boiler, of a circulator element within the fire-box of the boiler and communicating between the lower and upper portions of the boiler's water compartment, a plurality of water conveying elements one end of each connected to the circulator element intermediate its ends, the other end of each passing through and connected hermetically to the boiler's crown-sheet for discharging water upon the top of the crown sheet, a removable one unit heater element within the circulator element, said heater element having its upper end opening into the upper portion of the water compartment of the boiler and its lower end connected to a water supply line, and means carried by the outer shell of the boiler and so constructed and arranged as to provide for the removal of the heater element without disconnection of the circulator element.

2. In a combination water circulator and feed water heater for boilers, the combination with a boiler having a circulator element within its fire-box communicating between the lower and upper portions of the boiler's water compartment, of a removable feed water heater element within the circulator element and spaced from the walls thereof, said heater element comprising a tubular member having its upper end open and terminating in the water compartment of the boiler at a point slightly below the boiler's crown-sheet, said member having its lower portion reduced in diameter within the fire-box and having the reduced portion extending through the throat-sheet and outer shell of the boiler and connected to a water supply line.

3. A water circulator for boilers, comprising a plurality of parallel tubular circulator elements passing through the fire-box of a boiler and communicating between the lower and upper portions of the boiler's water compartment, communicating means connecting the elements, a plurality of water conveying elements one end of each connected to the communicating means and the other end of each passing through and connected hermetically to the boiler's crown sheet for discharging water upon the top of the crown-sheet of the boiler, and a rectangular cross-stayed hollow leg communicating between the interior of each of said circulator elements and the water compartment of the boiler above the crown-sheet.

4. Organization as described in claim 2, in which the circulator element is composed of two complemental body halves having their side edges meeting in edge to edge contact and welded together, said body halves being so shaped as to form a hollow protrusion extending longitudinally along each side of the element, and having stay-bolts through the protrusions.

5. A water circulator for boilers, comprising a circulator element exposed within the fire-box of a boiler and communicating between the lower and upper portions of the boiler's water compartment, and a plurality of water conveying elements one end of each connected to the circulator element intermediate its ends, the other end of each passing through and hermetically connected to the boiler's crown sheet for discharging water upon the top of the boiler's crown-sheet, said circulator element consisting of two complemental body halves each having its side edges meeting in edge to edge contact with the other and welded together, said body halves being shaped as to form a hollow protrusion extending longitudinally along each of its sides, and having stay-bolts through the protrusion.

6. A water circulator for boilers, comprising a plurality of parallel substantial tubular circulator elements passing through the fire-box of a boiler and communicating between the lower and upper portion of the boiler's water compartment, communicating means connecting the elements and a plurality of water conveying elements one end of each connected to the communicating means intermediate its ends, the other end of each passing through and connected hermetically to the boiler's crown sheet for discharging water upon the top of the crown-sheet of the boiler, the circulator elements and the communicating means between the elements being composed of two complemental body halves having their side edges meeting and hermetically sealed together in edge to edge contact, the body halves being so shaped as to form the most remote sides of the outermost one of the parallel elements as a hollow protrusion extending longitudinally therealong, and said protrusion having stay-bolts therethrough.

7. A water circulator for boilers, comprising a circulator element within the fire-box of a boiler, said circulator element being composed of two complemental body halves having their edges meeting in edge to edge contact and welded together, said body halves being so shaped as to form a hollow protrusion extending longitudinally along each of its sides and having stay-bolts through the protrusions.

8. A water circulator for boilers, comprising a circulator element within the fire-box of a boiler, said circulator element being composed of two complemental body halves meeting in edge to edge contact and having these edges welded together, said body halves being so shaped as to form a hollow protrusion extending longitudinally along each of its sides and having stay-bolts through the protrusions, the upper half of said element having a desired number of tubular water conveying elements entering thereinto, the upper ends of said water conveying elements terminating in the water space above the crown-sheet and being secured properly thereto.

9. A combination water circulator and feed water heater for boilers, comprising a circulator element passing through the fire-box of a boiler and communicating between the lower and upper portions of the boiler's water compartment, a plurality of water conveying elements one end of each connected to the circulator element intermediate its ends, the other end of each passing through and connected hermetically to the boiler's crown-sheet for discharging water upon the top of the crown-sheet, and a removable one unit heater element within the circulator element, said heater element having its lower end connected to a water supply line, and having its upper discharge end open, the discharge end passing through the fire-box wall for discharging feed water into the upper portion of the boiler's water compartment.

10. In a combination water circulator and feed water heater for boilers, the combination with a boiler having a circulator element within its fire-box communicating between the lower and upper portions of the boiler's water compartment, of a removable water heater element within the circulator element and spaced from the walls thereof, said heater element comprising a tubular member having its upper end open and terminating in the water compartment of the boiler slightly below the boiler's crown-sheet, said member having its lower portion extending through the throat-sheet and the outer shell of the boiler and connected to a water supply line.

11. A water circulator for boilers, comprising a circulator element within the fire-box of a boiler, said circulator element being composed of two complemental body halves having their edges meeting in edge to edge contact and welded together, said body halves being so shaped as to form a hollow protrusion extending longitudinally along each of its sides and having stay-bolts through the protrusion, and a plurality of vertically extending water conveying elements the lower end of each connected to the circulator element and in communication therewith, each of said conveyor elements having its upper end passing through and connected hermetically to the crown-sheet of the boiler, for discharging water upon the top of the crown sheet of the boiler.

EARL H. WALDROP.
GEO. M. PETTY.